United States Patent
Ebe

(10) Patent No.: US 7,588,296 B2
(45) Date of Patent: Sep. 15, 2009

(54) SEAT CUSHION PAD FOR VEHICLE, SEAT BACK PAD FOR VEHICLE, AND SEAT FOR VEHICLE

(75) Inventor: Kazushige Ebe, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/638,554

(22) Filed: Dec. 14, 2006

(65) Prior Publication Data

US 2007/0152491 A1    Jul. 5, 2007

Related U.S. Application Data

(63) Continuation of application No. PCT/JP2005/010846, filed on Jun. 14, 2005.

(30) Foreign Application Priority Data

Jun. 15, 2004  (JP) .............................. 2004-177148
Dec. 24, 2004  (JP) .............................. 2004-373897

(51) Int. Cl.
    *A47C 7/02*    (2006.01)
(52) U.S. Cl. .............................. 297/452.27; 297/452.37
(58) Field of Classification Search ............ 297/452.27, 297/452.37

See application file for complete search history.

(56) References Cited

U.S. PATENT DOCUMENTS 4,673,216 A * 6/1987 Alfer ..................... 297/452.27
6,623,675 B2 * 9/2003 Kobayashi et al. ......... 264/46.4
6,755,475 B1 * 6/2004 Tiesler et al. .......... 297/452.27

FOREIGN PATENT DOCUMENTS

| JP | 7-313286 A | 12/1995 |
|----|------------|---------|
| JP | 10-33297 A | 2/1998 |
| JP | 10-033297 A | 2/1998 |
| JP | 2001-25418 A | 1/2001 |
| JP | 2002-153357 A | 5/2002 |
| JP | 2002-165676 A | 6/2002 |
| JP | 2004-147979 A | 5/2004 |

* cited by examiner

*Primary Examiner*—Anthony D Barfield
(74) *Attorney, Agent, or Firm*—Sughrue Mion, PLLC

(57) ABSTRACT

A seat cushion pad for a vehicle and a seat back pad for a vehicle producing no discomfort between seat comfort of an under-hip section and a backrest section and that of the other sections. The seat cushion pad for a vehicle, in which a part of or entire seating surface except the under-hip section is composed of a material b having a density lower than the density of a material a, or the seat back pad has any one of features described in the following items (i) to (iii). (i) Load-deflection lines of the material a and the material b are allowed to substantially agree with each other. (ii) Amounts of depression or static spring constants of the material a and the material b by a specific reaction force (for example, 50 N or 100 N) based on a JASO-B408 testing method are allowed to substantially agree with each other. (iii) Reaction forces at a specific amount of deflection of the material a and the material b based on a push-pull gage measuring method are allowed to substantially agree with each other.

4 Claims, 7 Drawing Sheets

SEAT CUSHION PAD FOR VEHICLE, SEAT BACK PAD FOR VEHICLE, AND SEAT FOR VEHICLE

CROSS REFERENCE TO RELATED APPLICATION

This is a continuation application of PCT/JP2005/10846 filed on Jun. 14, 2005.

TECHNICAL FIELD

The present invention relates to a seat cushion pad for a vehicle and a seat back pad for a vehicle. Furthermore, the present invention relates to a seat for a vehicle provided with the above-described seat cushion pad for a vehicle and the seat back pad for a vehicle. In the present invention, "a seat cushion pad" refers to a pad disposed in a seating section of a seat, "a seat back pad" refers to a pad disposed in a backrest section of a seat, and "a seat" is a generic name for seats produced by combining the above-described seat cushion pad and the seat back pad, a surface cover, a spring bearing, and the like.

BACKGROUND ART

Heretofore, a seat cushion pad disposed in a seating section of a seat of an automobile or the like has been composed of an under-hip section, an under-thigh section, side bulging sections on both sides of the seating surface, and a rear end section, and has been produced by injecting an urethane formulation stock solution, which is produced by mixing a polyol component formulation solution and an isocyanate component, into a mold, followed by foam molding. Likewise, a seat back pad disposed in a backrest section has been composed of an upper backrest section, a lower backrest section, side bulging sections on both sides thereof, an upper end section, and a lower end section, and has been produced in a similar manner.

In the seat cushion pad and the seat back pad for a vehicle, portions in direct contact with the hip section and the back of an occupant, for example, the under-hip section of the seating surface, are applied with most of the occupant's weight, and materials for these sections have a close bearing on the seat comfort and ride comfort. Therefore, the constituent materials of the under-hip section and the like are important from the view point of the seat comfort and the ride comfort. However, the other sections are applied with a small load of the weight and, therefore, the importance is relatively low.

In order to facilitate weight reduction and cost reduction of the seat cushion pad for a vehicle, an improved seat cushion pad for a vehicle has been proposed, in which, for example, an under-hip section of a seating surface having a largest influence on the seat comfort has been made a high-density section, and the other sections have been made low-density sections. Japanese Unexamined Patent Application Publication No. 2002-153357 discloses a seat cushion pad for a vehicle in which a part of or entire seating surface except an under-hip section has been made to have a density lower than the density of the under-hip section and a hardness nearly equal to the hardness of the under-hip section.

It is specified that "the 25% hardnesses" defined in JASO-B408 are allowed to agree with each other in order to match the feeling (feeling in seating) about the under-hip section and the feeling about the other sections with each other. However, in the method for measuring the 25% hardness, a large disk having a diameter of 200 mm is used and, in addition, a value of reaction force is read after the 25% compression is kept for 20 seconds. Therefore, even when the 25% hardnesses are allowed to agree with each other, the feeling about the foam of the under-hip section is different from the feeling about the foam of the other sections, because different formulations are used. Consequently, the occupant feels discomfort.

FIG. 10a shows load-deflection diagrams and stress relaxation after keeping for 20 seconds during measurement of the 25% hardness of two types of urethane foam having an equal 25% hardness of 314 N, as shown in Tables 1 and 2. FIG. 10b is a diagram showing a magnified stress relaxation portion.

As shown in FIGS. 10a and 10b, even when the 25% hardnesses are equal, the amounts of stress relaxation are different and the reaction forces before keeping for 20 seconds are different depending on the formulations.

In order to attain the same 25% hardness, a resin in the urethane foam having a low-density urethane formulation (Q) must be made harder. In general, a harder resin exhibits a larger amount of stress relaxation. Therefore, the reaction force before keeping for 20 seconds of the urethane foam having a low-density formulation (Q) is higher than that of the urethane foam having a high-density formulation (P) by about 7 N. As a result, at the instant when being pushed, the urethane foam having the formulation (Q) produces a harder feeling.

With respect to the low density, high hardness urethane, the resin itself is harder than the resin of the high-density urethane having the same level of hardness. Therefore, the tension of the pad surface portion is high and a taut and hard feeling is produced as compared with a soft, elastic, and high-density urethane. Even when the 25% hardnesses are equal, the difference therebetween becomes evident by pressing the foam with a finger or the like having a small area.

FIG. 11 shows a load-deflection diagram when the formulation Q and the formulation P having an equal 25% hardness are pressed with a disk having a diameter of 10 mm. The low-density, hard formulation Q exhibits a compressive load (reaction force) about 40% higher than that of the high-density formulation P. This indicates that since such a difference is exhibited by pressing with the disk having a diameter close to the thickness of a finger, the formulation Q feels harder to the touch with a hand even when the 25% hardness is the same.

The thighs and hands rather than the hip are mainly brought into contact with the under-thigh section and side bulging sections in the seating. These sections have contact areas smaller than that of the under-hip section, and loads to be applied are also small. Therefore, pressing with a smaller disk rather than pressing with a disk having a diameter of 200 mm is suitable for matching the feeling about them with the feeling about the under-hip section because a produced feeling is close to an actual feeling.

Likewise, in the case where these two types of urethane foam are pressed with a pressure probe 131 at the front end of a push-pull gauge 130 shown in FIG. 13a, the values of the formulation Q and the formulation P are 17.5 N and 13.7 N, respectively. Therefore, the formulation Q exhibits a higher value and becomes harder. Since this pressure probe 131 is pressed into a sample 140 by 15 mm so as to measure the reaction force, as shown in FIGS. 13b and 13c, the front end side of the pressure probe 131 is in the shape of a hemisphere having a diameter of 20 mm.

As described above, in the case where different materials are used for the under-hip section, the under-thigh section, and the side bulging sections, the feelings about the foams cannot be matched with each other simply by allowing the 25% hardnesses defined in JASO-B408 (JIS K-6401) to agree with each other, and uncomfortable feelings are produced among the formulations.

DISCLOSURE OF INVENTION

It is an object of the present invention to solve the above-described known problems and provide a seat cushion pad for a vehicle, a seat back pad for a vehicle, and a seat for a vehicle, which produce no discomfort between seat comfort of center sections, e.g., an under-hip section and a backrest section, and that of the periphery sections.

In a seat cushion pad for a vehicle according to a first aspect, a part of or entire seating surface except an under-hip section is composed of a material b having a density lower than the density of a material a constituting the under-hip section. Load-deflection lines of the material a and the material b are allowed to substantially agree with each other.

In a seat cushion pad for a vehicle according to a second aspect, a part of or entire seating surface except an under-hip section is composed of a material b having a density lower than the density of a material a constituting the under-hip section. Amounts of depression or static spring constants of the material a and the material b based on a surface hardness test specified in JASO-B408 testing method are allowed to substantially agree with each other.

In a seat cushion pad for a vehicle according to a third aspect, a part of or entire seating surface except an under-hip section is composed of a material b having a density lower than the density of a material a constituting the under-hip section. Reaction forces of the material a and the material b based on a push-pull gage measuring method are allowed to substantially agree with each other.

A seat for a vehicle according to a fourth aspect is provided with the seat cushion pad for a vehicle according to any one of the first to the third aspects.

In a seat back pad for a vehicle according to a fifth aspect, a part of or entire sections except a backrest section is composed of a material d having a density lower than the density of a material c constituting the backrest section. Load-deflection lines of the material c and the material d are allowed to substantially agree with each other.

In a seat back pad for a vehicle according to a sixth aspect, a part of or entire sections except a backrest section is composed of a material d having a density lower than the density of a material c constituting the backrest section. Amounts of depression or static spring constants of the material c and the material d based on a surface hardness test specified in JASO-B408 testing method are allowed to substantially agree with each other.

In a seat back pad for a vehicle according to a seventh aspect, a part of or entire sections except a backrest section is composed of a material d having a density lower than the density of a material c constituting the backrest section. Reaction forces of the material c and the material d based on a push-pull gage measuring method are allowed to substantially agree with each other.

A seat for a vehicle according to an eighth aspect is provided with the seat back pad for a vehicle according to any one of the fifth to seventh aspects.

In the present invention, the density refers to "an OA density (overall density; general density)".

DETAILED DESCRIPTION OF THE PREFERRED EMBODIMENTS

Figure 1:
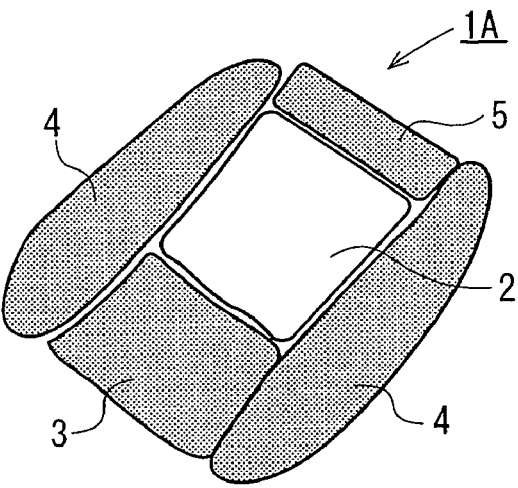
FIG. 1 is a perspective view showing an embodiment of a seat cushion pad for a vehicle according to the present invention.

In the present invention, foam characteristics of an under-hip section or a backrest section and other sections are matched with each other not by the 25% hardness but by the load-deflection diagram. At that time, desirably, matching is performed by the reaction force against a pressure applied with a small disk (the diameter of 150 mm or less, more desirably the diameter of 80 mm or less), or by the amount of deflection when a predetermined load is applied. In this manner, the foam feelings about the under-hip section or the backrest section and about the other sections are brought close to each other, and it becomes possible to produce a pad which does not feel discomfort.

Consequently, according to the present invention, a seat cushion pad for a vehicle and a seat back pad for a vehicle are provided, wherein weight reduction and cost reduction are facilitated without impairing the seat comfort, the ride comfort, and the durability, and the seat cushion pad for a vehicle and the seat back pad for a vehicle are prevented from producing discomfort between the under-hip section or the backrest section and the other sections.

In the case where the feelings about the foams as raw materials are matched with each other without considering shape factors, it is desirable that deflection characteristics, amounts of depression, spring constants, and push-pull values of the same shape (for example, test piece of 400×400× 100 mm) are allowed to agree. The deflection characteristics, the amounts of depression, the spring constants, and the push-pull values of cut samples may be allowed to agree, where the samples have been cut into the same shape and are compressed entirely.

On the other hand, in the case where the feelings about individual sections in the product shapes are matched with each other, it is recommended that the deflection characteristics, the amounts of depression, the spring constants, and the push-pull values of individual sections in the product shapes are allowed to agree.

In this case, since the deflection characteristics, the amounts of depression, the spring constants, and the push-pull values in the product shapes on an "as is" basis are measured, the deflection characteristics, the amounts of depression, the spring constants, and the push-pull values of the under-hip section and under-thigh section can be used as control items of the product on an "as is" basis.

The deflection characteristics, the amounts of depression, the spring constants, and the push-pull values of cut samples may be allowed to agree, where the samples have been cut into the same shape and are compressed entirely.

The preferred embodiments of the seat cushion pad for a vehicle and the seat back pad for a vehicle according to the present invention will be described below in detail with reference to the drawings.

FIGS. 1 to 5 are perspective views, each showing an embodiment of the seat cushion pad for a vehicle according to the present invention. FIGS. 6 to 9 are perspective views, each showing an embodiment of the seat back pad for a vehicle according to the present invention.

In a seat cushion pad for a vehicle 1A shown in FIG. 1, an under-hip section 2 is simply a high-density section, and the other sections, an under-thigh section 3, side bulging sections 4, and a rear end section 5, are low-density sections.

Figure 2:
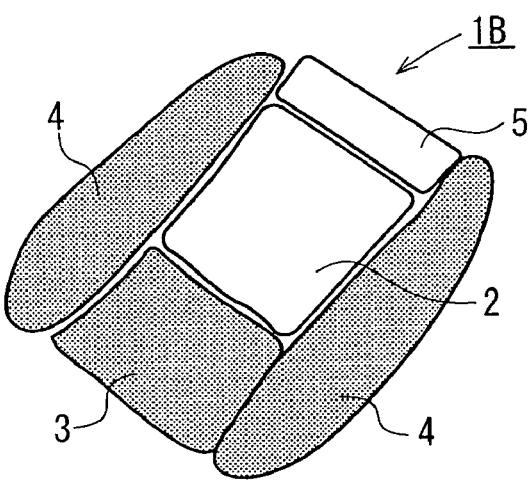
FIG. 2 is a perspective view showing another embodiment of a seat cushion pad for a vehicle according to the present invention.

In a seat cushion pad for a vehicle 1B shown in FIG. 2, an under-hip section 2 and a rear end section 5 are high-density sections, and an under-thigh section 3 and side bulging sections 4 are low-density sections.

Figure 3:
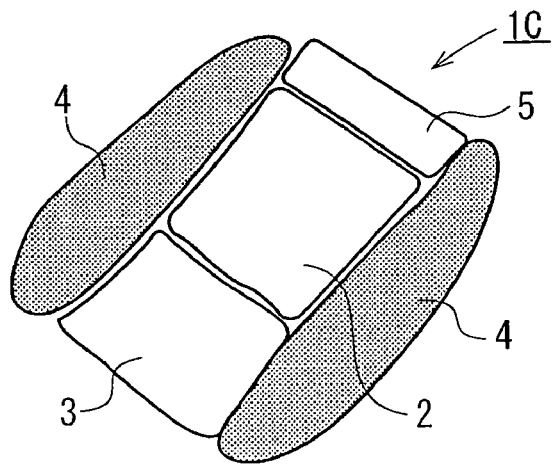
FIG. 3 is a perspective view showing another embodiment of a seat cushion pad for a vehicle according to the present invention.

In a seat cushion pad for a vehicle 1C shown in FIG. 3, side bulging sections 4 are simply low-density sections, and the other sections, an under-hip section 2, an under-thigh section 3, and a rear end section 5, are high-density sections.

Figure 4:
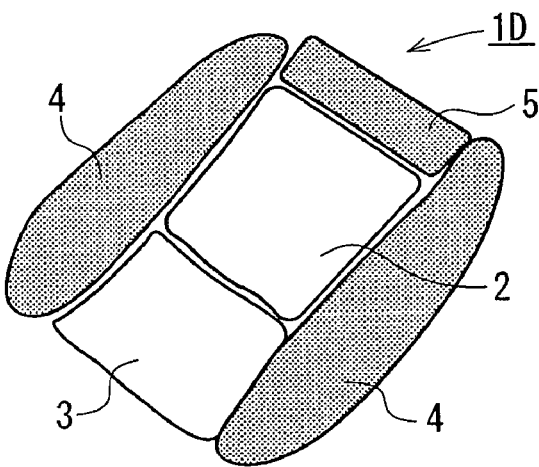
FIG. 4 is a perspective view showing another embodiment of a seat cushion pad for a vehicle according to the present invention.

In a seat cushion pad for a vehicle 1D shown in FIG. 4, an under-hip section 2 and an under-thigh section 3 are high-density sections, and side bulging sections 4 and a rear end section 5 are low-density sections.

Figure 5:
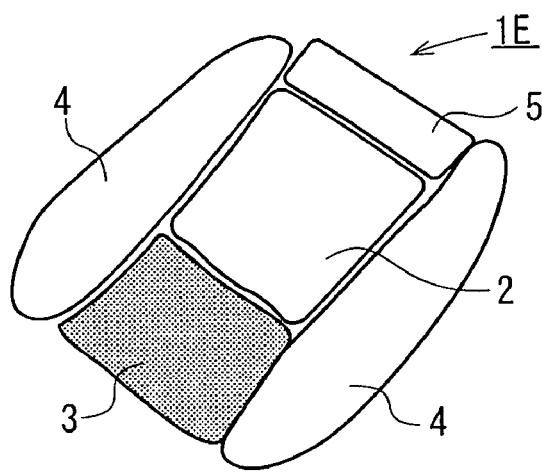
FIG. 5 is a perspective view showing another embodiment of a seat cushion pad for a vehicle according to the present invention.

In a seat cushion pad for a vehicle 1E shown in FIG. 5, an under-thigh section 3 is simply a low-density section, and the other sections, an under-hip section 2, side bulging sections 4, and a rear end section 5, are high-density sections.

Figure 6:
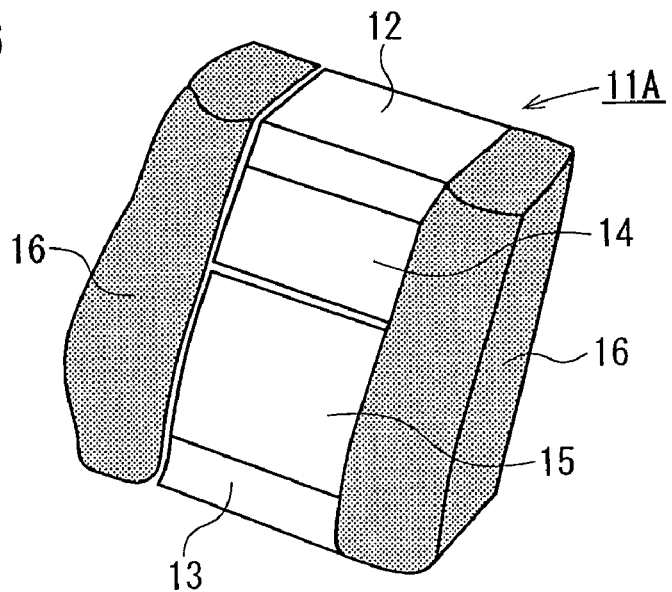
FIG. 6 is a perspective view showing an embodiment of a seat back pad for a vehicle according to the present invention.

In a seat back pad for a vehicle 11A shown in FIG. 6, side bulging sections 16 are simply low-density sections, and the other sections, an upper end section 12, a lower end section 13, an upper backrest section 14, and a lower backrest section 15, are high-density sections.

Figure 7:
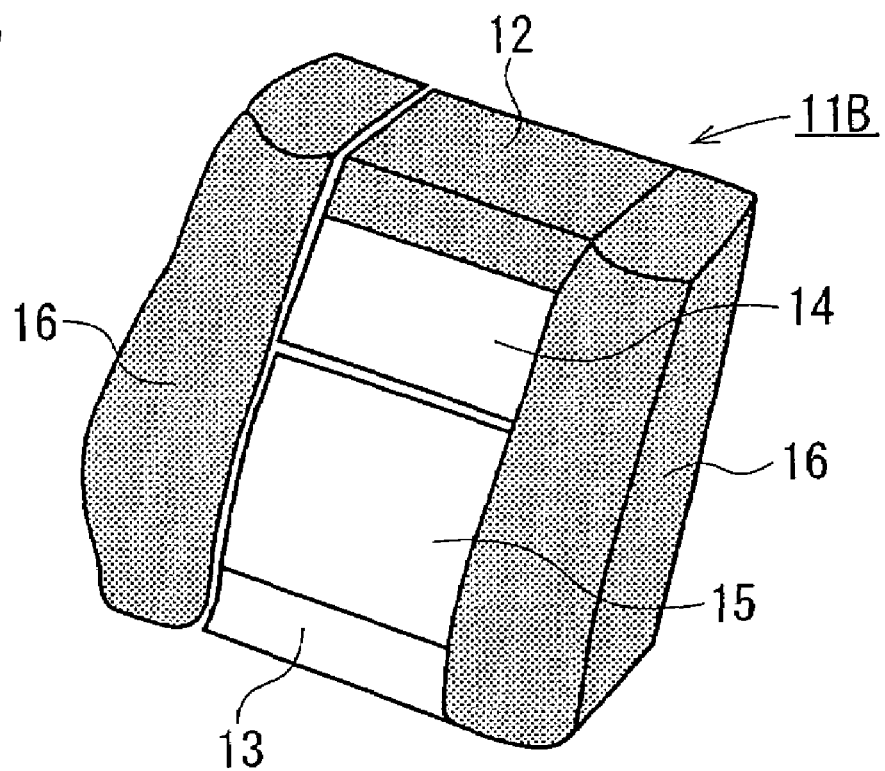
FIG. 7 is a perspective view showing another embodiment of a seat back pad for a vehicle according to the present invention.

In a seat back pad for a vehicle 11B shown in FIG. 7, side bulging sections 16 and an upper end section 12 are low-density sections, and the other sections, a lower end section 13, an upper backrest section 14, and a lower backrest section 15, are high-density sections.

Figure 8:
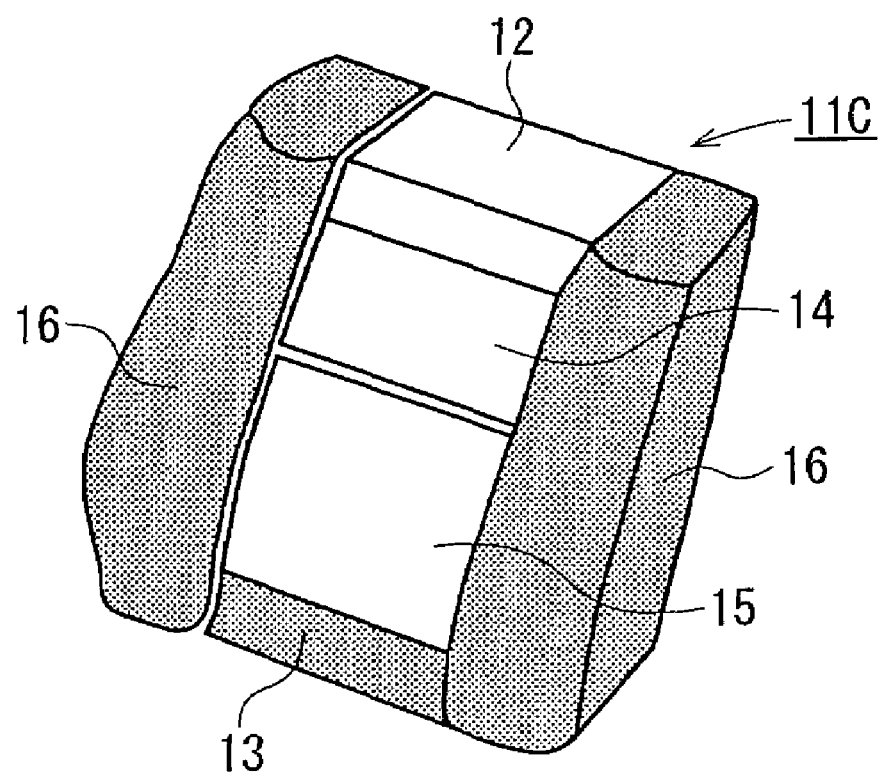
FIG. 8 is a perspective view showing another embodiment of a seat back pad for a vehicle according to the present invention.

In a seat back pad for a vehicle 11C shown in FIG. 8, side bulging sections 16 and a lower end section 13 are low-density sections, and the other sections, an upper end section 12, an upper backrest section 14, and a lower backrest section 15, are high-density sections.

Figure 9:
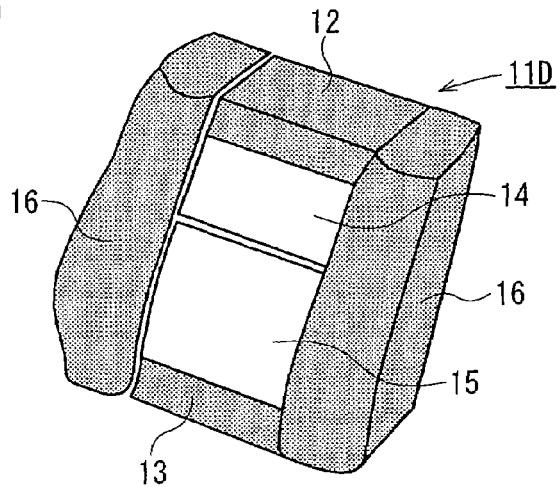
FIG. 9 is a perspective view showing another embodiment of a seat back pad for a vehicle according to the present invention.

In a seat back pad for a vehicle 11D shown in FIG. 9, side bulging sections 16, an upper end section 12, and a lower end section 13 are low-density sections, and the other sections, an upper backrest section 14 and a lower backrest section 15, are high-density sections.

Preferably, the density $D_A$ of the high-density section is about 40 to 80 kg/m$^3$ for the cushion, and about 30 to 60 kg/m$^3$ for the back in order to ensure the seat comfort, the ride comfort, the durability, and the like. Preferably, the hardness $H_A$ is about 150 to 300 N for the cushion, and about 60 to 150 N for the back.

Preferably, the density $D_B$ of the low-density section is about 40% to 95% of the density $D_A$ of the high-density section in order to facilitate weight reduction.

This high-density section is formed by foam molding an urethane formulation stock solution A, and the low-density section is formed by foam molding an urethane formulation stock solution B. The high-density section composed of the urethane formulation stock solution A and the low-density section composed of the urethane formulation stock solution B can be produced as in the following items [I] and [II].

[I] The urethane formulation stock solution A, which exhibits a hardness of $H_{XA}$ when being foam molded in such a way that the density becomes $D_X$ (where $D_A > D_X > D_B$), is used for the high-density section. This urethane formulation stock solution A is foam molded in such a way that the density becomes $D_A$. The urethane formulation stock solution B prepared by increasing the isocyanate index of an urethane formulation stock solution B', which exhibits a hardness of $H_{XB}'$, higher than the hardness of $H_{XA}$ when being foam molded in such a way that the density becomes $D_X$ (where, $D_A > D_X > D_B$), is used for the low-density section. This urethane formulation stock solution B is foam molded in such a way that the density becomes $D_B$.

It is preferable that the isocyanate indices of the urethane formulation stock solution A and the urethane formulation stock solution B' to be foam molded to have a density $D_X$ are at the same level. Preferably, the isocyanate indices of the two are about 80 to 120. Preferably, the urethane formulation stock solution B' having an equal density and a high hardness as compared with those of the urethane formulation stock solution A exhibits the hardness of $H_{XB}'$ 1.1 times or more, for example, 1.2 to 2.0 times the hardness of $H_{XA}$ of the urethane formulation stock solution A.

The urethane formulation stock solution B is prepared by increasing the isocyanate index of the urethane formulation stock solution B' by about 1 to 20 in such a way that the hardness of $H_B$ can be attained at a density of $D_B$. In order to increase the isocyanate index, it is simple to adjust the blending ratio of the polyol component formulation solution and the isocyanate component in the urethane formulation stock solution B' so as to increase the isocyanate component.

[II] For the high-density section, the urethane formulation stock solution A prepared by decreasing the isocyanate index of an urethane formulation stock solution A', which exhibits a hardness of $H_{XA}'$ when being foam molded in such a way that the density becomes $D_X$ (where $D_A > D_X > D_B$), is foam molded in such a way that the density becomes $D_A$. For the low-density section, the urethane formulation stock solution B prepared by increasing the isocyanate index of the urethane formulation stock solution B', which exhibits a hardness of $H_{XB}'$ higher than the hardness of $H_{XA}$ when being foam molded in such a way that the density becomes $D_X$ (where $D_A > D_X > D_B$), is used, and this urethane formulation stock solution B is foam molded in such a way that the density becomes $D_B$.

It is preferable that the isocyanate indices of the urethane formulation stock solution A' and the urethane formulation stock solution B' to be foam molded to have a density $D_X$ are at the same level. Preferably, the isocyanate indices of the two are about 80 to 120. Preferably, the urethane formulation stock solution B' having an equal density and a high hardness as compared with those of the urethane formulation stock solution A' exhibits the hardness of $H_{XB}'$ 1.1 times or more, for example, 1.2 to 2.0 times the hardness of $H_{XA}'$ of the urethane formulation stock solution A'.

The urethane formulation stock solution A can be prepared by decreasing the amount of isocyanate component in the urethane formulation stock solution A' in such a way that the isocyanate index is decreased by about 1 to 20, preferably about 2 to 10 and the hardness of $H_A$ is attained at a density of $D_A$. The urethane formulation stock solution B can be prepared by decreasing the amount of isocyanate component in the urethane formulation stock solution B' in such a way that the isocyanate index is decreased by about 1 to 20, preferably about 2 to 10 and the hardness of $H_B$ is attained at a density of $D_B$.

In this manner, the low-density section is constructed by adjusting the isocyanate index as well as by adjusting the density of the urethane formulation stock solution B' having a high hardness at an equal density as compared with that of the urethane formulation stock solution A or the urethane formulation stock solution A' and exhibiting a brittle behavior. The index of the formulation stock solution B' is increased in the case of item [I], the index of the formulation stock solution A' is decreased in the case of item [II] and, thereby, it is intended to increase the difference in density between the high-density section and the low-density section and further improve a weight reduction effect of the pad product. Since there is a difference in hardness between the formulation stock solutions A' and B' at the same density, the index can be selected freely within the bounds of the indices being equal or the weight reduction of the product being facilitated.

In the present invention, the following configuration is adopted and, thereby, a seat cushion pad for a vehicle and a seat back pad for a vehicle, which produce no discomfort between seat comfort of an under-hip section or a backrest section and the other sections, are prepared.

(i) The load-deflection lines of the materials a and b are allowed to substantially agree with each other and those of the materials c and d are allowed to substantially agree with each other. Preferably, the difference in load-deflection line between the materials a and b and that between the materials c and d are within ±15% throughout the lines and, in particular, within ±5%.

The difference in load-deflection line varies depending on the size of the pressure probe. As shown in FIG. 10b, when a pressure is applied with a disk having a diameter of 200 mm, the difference in amount of deflection between products having the same hardness becomes 2%.

Figure 11:
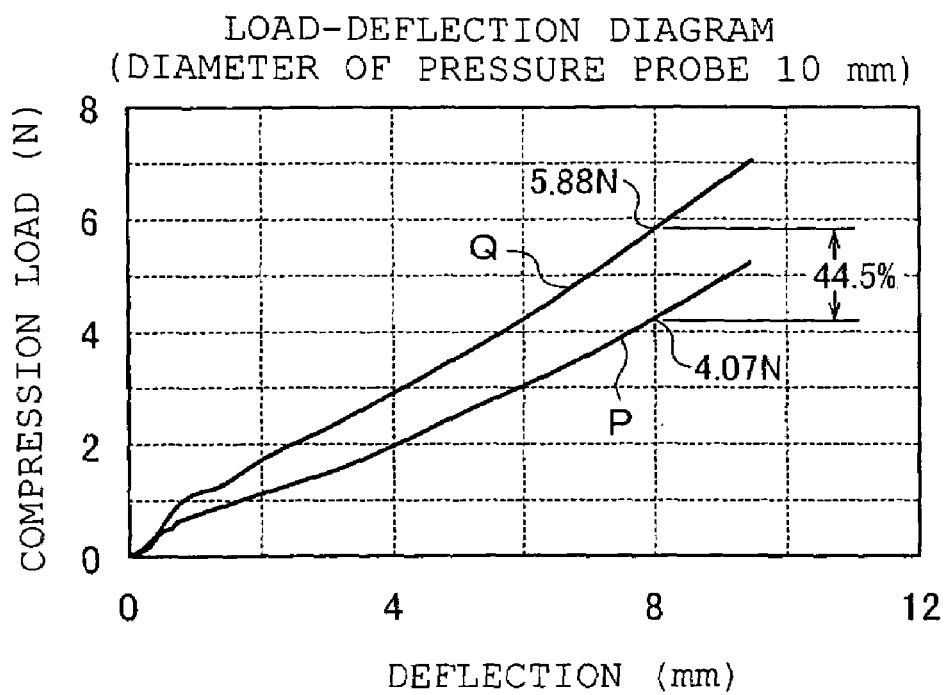
FIG. 11 is a graph showing load (N)-strain curves of urethane having known formulations.

On the other hand, as shown in FIG. 11, when a pressure is applied with a disk having a diameter of 10 mm, the difference in foam feeling becomes evident significantly, and the difference can reach 44.5%.

(ii) The amounts of depression or static spring constants of the materials a and b by a specific reaction force (for example, 50 N or 100 N) based on a JASO-B408 testing method are allowed to substantially agree with each other and those of the materials c and d are allowed to substantially agree with each other. Preferably, the difference in amount of depression or static spring constant between the materials a and b and that between the materials c and d are within ±15% and, in particular, within ±5%.

(iii) The reaction forces at a specific amount of deflection (for example, 10 mm or 20 mm) of the materials a and b based on a push-pull gage measuring method are allowed to substantially agree with each other and those of the materials c and d are allowed to substantially agree with each other. Preferably, the difference in amount of reaction force between the materials a and b and that between the materials c and d are within ±15% and, in particular, within ±5%.

Each of FIGS. 1 to 5 shows an example of the embodiment of the seat cushion pad for a vehicle according to the present invention. The present invention is not limited to those shown in the drawings as long as deviation from the gist of the invention does not occur. With respect to the seat cushion pad for a vehicle according to the present invention, it is essential that the under-hip section is the high-density section, the side bulging sections and/or the under-thigh section are the low-density sections, and any one of the above-described items (i) to (iii) is satisfied.

Each of FIGS. 6 to 9 shows an example of the seat back pad for a vehicle according to the present invention. The present invention is not limited to those shown in the drawings as long as deviation from the gist of the invention does not occur. With respect to the seat back pad for a vehicle according to the present invention, it is essential that the side bulging sections are the low-density sections, the upper and the lower backrest sections are the high-density sections, and any one of the above-described items (i) to (iii) is satisfied.

In the present invention, it is preferable that 20 to 70% of the total volume of the seat cushion pad or the seat back pad is the high-density section and the remainder is the low-density section in order to satisfactorily facilitate weight reduction and cost reduction without impairing the seat comfort, the ride comfort, and the durability.

Each of the above-described embodiments is an example of application of the present invention to a single seat, that is, a so-called separate type seat. However, the present invention can also be applied to at least a double seat, that is, a so-called bench type seat.

EXAMPLES

The present invention will be specifically described below with reference to Experimental examples, Example, and Comparative examples.

Experimental Example 1

A polyol component formulation solution having a formulation shown in the left column of the following Table 1 and "Cornate T-80" produced by NIPPON POLYURETHANE INDUSTRY CO., LTD., as an isocyanate component were mixed in such a way that the isocyanate index became 100, so that an urethane formulation stock solution P was prepared. The resulting urethane formulation stock solution P was foamed in such a way that the density became 72 kg/m³ so as to form a test piece of 400 mm×400 mm and 100 mm thick.

Experimental Example 2

A polyol component formulation solution having a formulation shown in the right column of the following Table 1 and "Cornate T-80" produced by NIPPON POLYURETHANE INDUSTRY CO., LTD., were mixed in such a way that the isocyanate index became 100, so that an urethane formulation stock solution Q was prepared. The resulting urethane formulation stock solution Q was foamed in such a way that the density became 58 kg/m³ so as to form a test piece of 400 mm×400 mm and 100 mm thick.

TABLE 1

| Formulation | | No. | |
|---|---|---|---|
| | | Experimental example 1 (polyol component formulation solution for urethane formulation stock solution P) | Experimental example 2 (polyol component formulation solution for urethane formulation stock solution Q) |
| Formulation ratio (parts by weight) | polyol (produced by Asahi Glass Co., Ltd.) "EL828" | 50 | 58 |
| | cross-linking agent (produced by Asahi Glass Co., Ltd.) "EL981" | 3 | 2 |
| | polymer polyol (produced by Sanyo Chemical Industries, Ltd.) "KC827" | 47 | 40 |
| | catalyst (produced by Tosoh Corporation) "TEDAL 33" | 0.9 | 0.5 |
| | foam stabilizer (produced by Toray Industries, Ltd.) "BY10-304" | 0.7 | 1.0 |
| | foaming agent water | 2.5 | 3.3 |

Table 2 shows the overall density, the 25% hardness based on JASO-B408 (JIS K 6401), and the hardness (PP hardness) based on a push-pull gauge of the test piece produced from the urethane formulation stock solution P and the urethane formulation stock solution Q.

TABLE 2

| No. | Urethane formulation stock solution | Density (kg/m$^3$) | 25% hardness (N) | PP hardness (N) | Isocyanate index |
|---|---|---|---|---|---|
| Experimental example 1 | urethane formulation stock solution Q | 58 | 314 | 17.5 | 105 |
| Experimental example 2 | urethane formulation stock solution P | 72 | 314 | 13.7 | 105 |

Figure 10A:
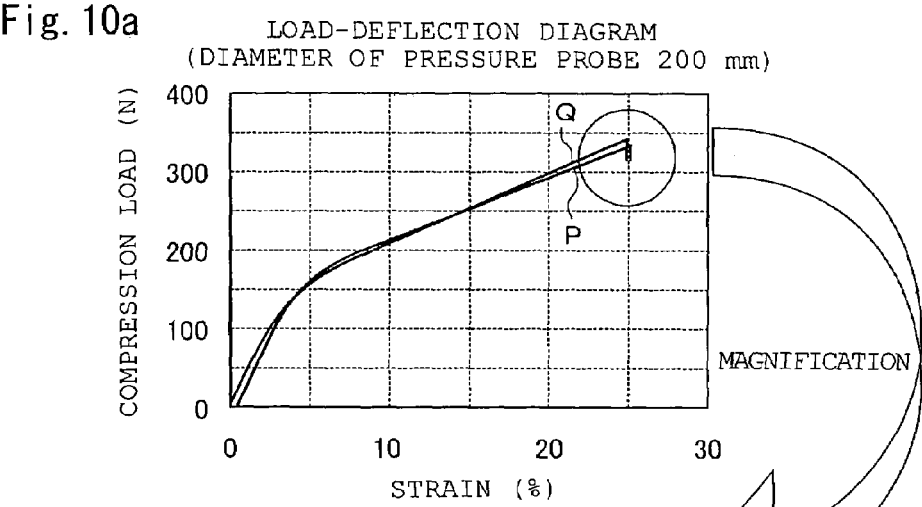
FIGS. 10a and 10b are graphs showing load (N)-strain (%) curves of urethane having known formulations.
Figure 10B:
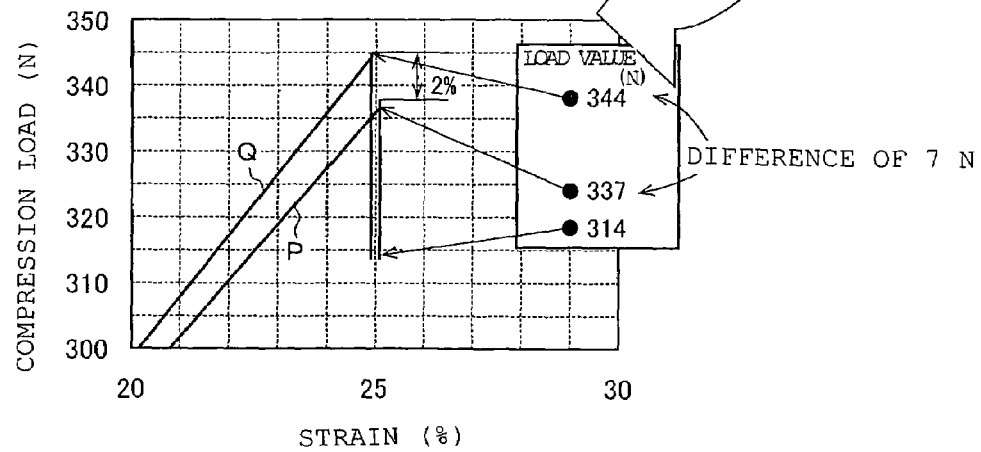

FIGS. 10a and 10b show load (N)-deflection (mm) curves when the resulting test pieces were examined individually by using a pressure probe having a diameter of 200 mm. FIG. 11 shows load (N)-deflection (mm) curves when the test pieces were examined by using a pressure probe having a diameter of 10 mm.

Example 1

A solution prepared by decreasing the amount of blending of the isocyanate component of the urethane formulation stock solution Q so as to make the isocyanate index 90 was used as the urethane formulation stock solution for producing side bulging sections and a rear end section. An urethane formulation stock solution P having an isocyanate index of 100 was used for an under-hip section. A seat cushion pad for a vehicle was produced by using these urethane formulation stock solutions.

The density and the hardness of the under-hip section, the densities and the hardnesses of the side bulging sections, the under-thigh section, and the rear end section, and the total weight of the product of this seat cushion pad for a vehicle are as shown in Table 3.

With respect to this seat cushion pad for a vehicle, the discomfort about the thigh section was evaluated by the following method, and the results are shown in Table 3. In each evaluation, the criteria were normal expressed as (A), no good (NG), good (G), and very good (VG).

[Discomfort about Thigh Section]

A monitor seated actually, and evaluated the feeling at that time.

Comparative Example 1

A seat cushion pad for a vehicle was produced as in Example 1 except that all sections were produced by using the urethane formulation stock solution P. The evaluation was performed similarly. The results are shown in Table 3.

Comparative Example 2

A seat cushion pad for a vehicle was produced as in Example 1 except that the urethane formulation stock solution Q having an isocyanate index of 100 was used as the urethane formulation stock solution for producing the side bulging sections, the under-thigh section, and the rear end section. The evaluation was performed similarly. The results are shown in Table 3.

TABLE 3

| | Under-hip section | | | | | Side bulging section, under-thigh section and rear end section | | | | | Product weight (g) | Discomfort about side section and thigh section |
|---|---|---|---|---|---|---|---|---|---|---|---|---|
| Case | Material | Index | Density (kg/m³) | 25% hardness[×] (N) | PP hardness (N) | Material | Index | Density (kg/m³) | 25% hardness[×] (N) | PP hardness (N) | | |
| Example 1 | formulation P | 100 | 66 | 265 | 11.6 | formulation Q | 90 | 56 | 208 | 11.6 | 1145 | ○ |
| Comparative example 1 | formulation P | 100 | 66 | 265 | 11.6 | formulation P | 100 | 66 | 265 | 11.6 | 1255 | Δ |
| Comparative example 2 | formulation P | 100 | 66 | 265 | 11.6 | formulation Q | 100 | 56 | 265 | 14.8 | 1145 | × |

[×]25% hardness in terms of test piece of 400 × 400 × 100 mm

Figure 12:
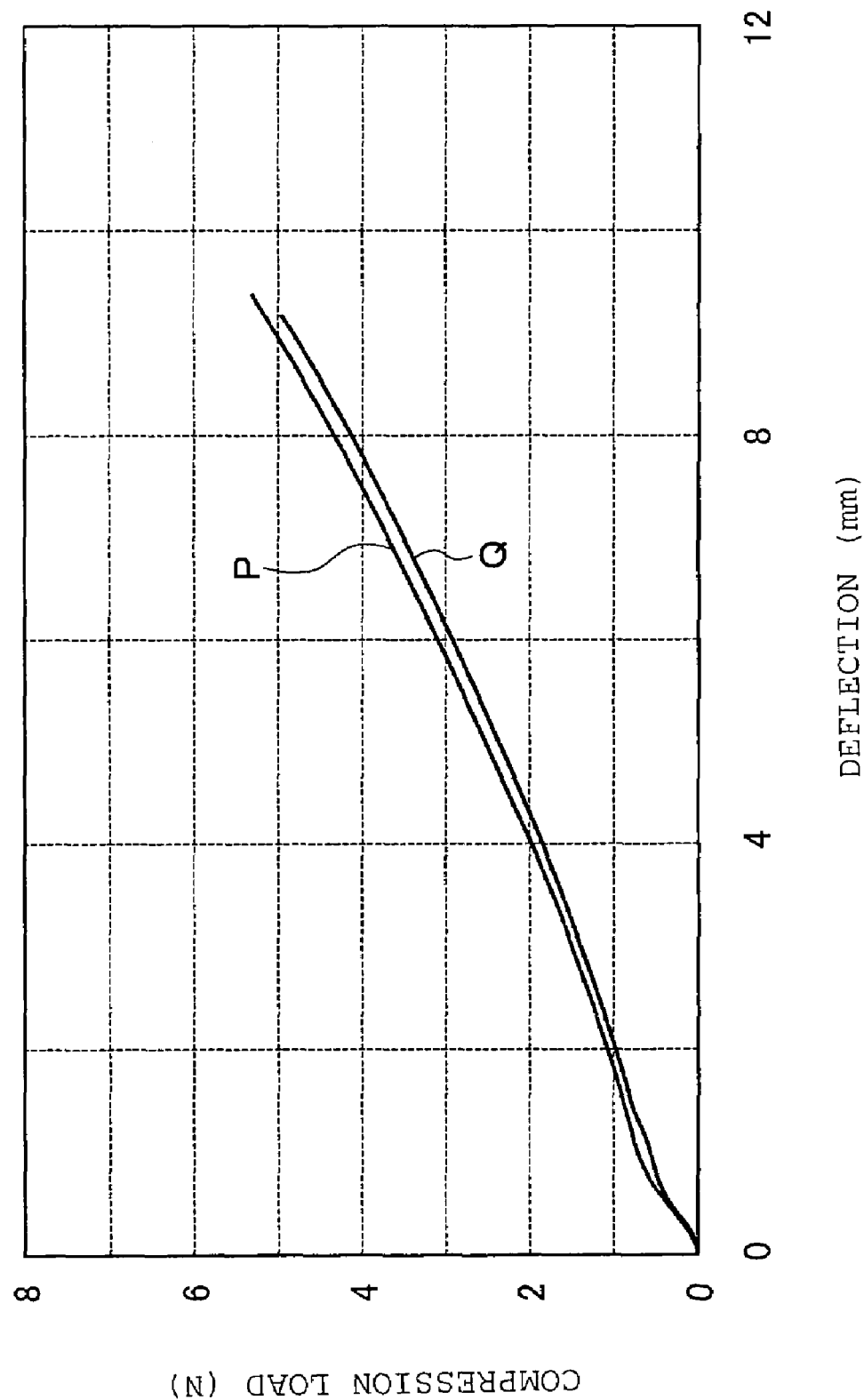
FIG. 12 is a graph showing each of load (N)-deflection (mm) curves of test pieces of an urethane formulation stock solution P and an urethane formulation stock solution Q, which are produced in Example 1 shown in Table 3, examined by using a pressure probe having a diameter of 10 mm.
Figure 13A:
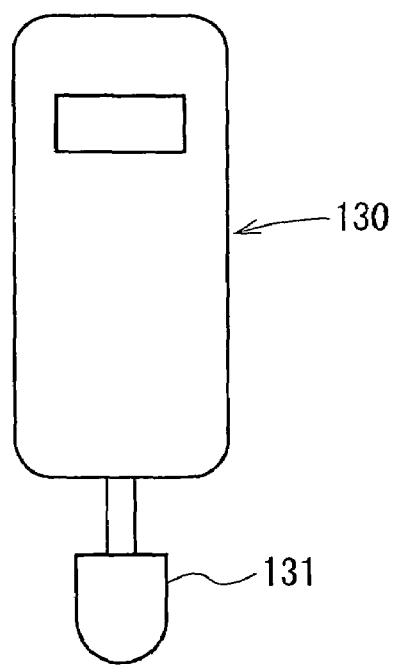
FIGS. 13a, 13b, and 13c are explanatory diagrams of a method for measuring a hardness with a push-pull gage.
Figure 13B:
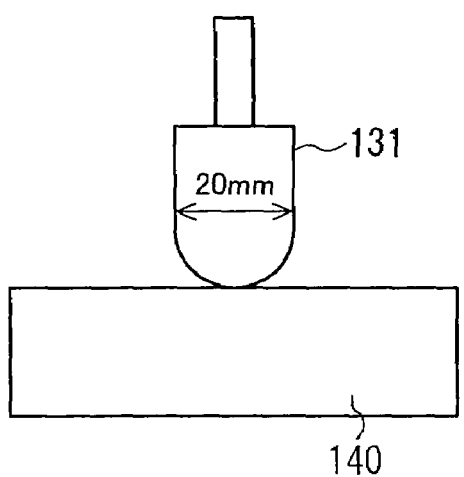
Figure 13C:
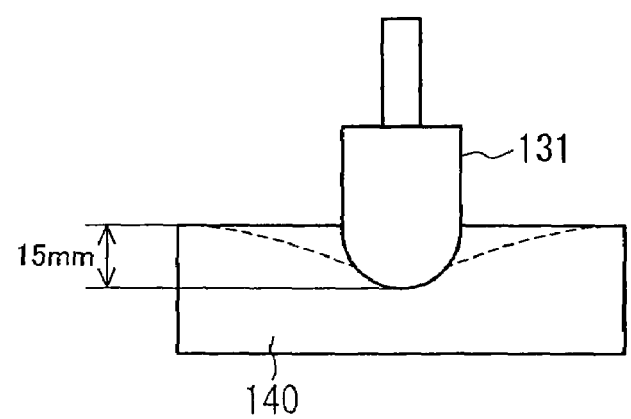

As shown in Table 3, in Example 1 in which the hardnesses based on the push-pull gauge (PP hardness) were allowed to agree with each other, the covering appearance and the side support performance can be improved without producing discomfort about the thigh section as compared with Comparative example 1, in which the urethane formulation stock solution P was used alone. FIG. 12 shows a load (N)-deflection (mm) diagram produced by pressing the urethane foam prepared from the formulations P and Q in this case with a pressure probe having a diameter of 10 mm. As shown in FIG. 12, the difference in load-deflection line between individual urethane foams is within 6% throughout the lines.

In Comparative example 2 in which a low-density formulation Q was used for the side bulging sections and the like, while the 25% hardnesses were allowed to agree with each other, and the side support property is good. However, discomfort about the thigh is significant.

The seat cushion pad for a vehicle and the seat back pad for a vehicle according to the present invention are useful as seat cushion pads for vehicles, e.g., automobiles, and seat back pads for vehicles, e.g., automobiles. According to the present invention, weight reduction and cost reduction of the seat cushion pad for a vehicle and the seat back pad for a vehicle are facilitated and, in addition, the seat comfort is improved.

The invention claimed is:

1. A seat cushion pad for a vehicle, characterized in that a part of or entire seating surface except an under-hip section comprises a material b having a density lower than the density of a material a constituting the under-hip section,
   wherein load-deflection lines of the material a and the material b are allowed to substantially agree with each other;
   wherein a pressure plate has a diameter of 10 mm in measurement of the load-deflection line, and
   wherein a load-deflection line of the material a is equal to or less than a load-deflection line of the material b in deflection, and the difference in deflection between the material a and the material b is within 15% when the same load is applied thereto.

2. A seat for a vehicle, comprising the seat cushion pad for a vehicle according to claim 1.

3. A seat back pad for a vehicle, characterized in that a part of or entire sections except a backrest section comprise a material d having a density lower than the density of a material c constituting the backrest section,
   wherein load-deflection lines of the material c and the material d are allowed to substantially agree with each other;
   wherein a pressure plate has a diameter of 10 mm in measurement of the load-deflection line, and
   wherein a load-deflection line of the material c is equal to or less than a load-deflection line of the material d in deflection, and the difference in deflection between the material c and the material d is within 15% when the same load is applied thereto.

4. A seat for a vehicle, comprising the seat back pad for a vehicle according to claim 3.

* * * * *